(12) United States Patent
Nicholls et al.

(10) Patent No.: US 9,308,557 B2
(45) Date of Patent: Apr. 12, 2016

(54) TURF INFILL RECLAMATION METHOD

(71) Applicant: Turf Industry Holdings LLC, Dalton, GA (US)

(72) Inventors: Mark H. Nicholls, Welland (CA); Michael A. Hartwell, Englewood, CO (US)

(73) Assignee: Turf Industry Holdings LLC, Dalton, GA (US)

( * ) Notice: Subject to any disclaimer, the term of this patent is extended or adjusted under 35 U.S.C. 154(b) by 0 days.

(21) Appl. No.: 14/697,297

(22) Filed: Apr. 27, 2015

(65) Prior Publication Data

US 2015/0224542 A1  Aug. 13, 2015

Related U.S. Application Data

(62) Division of application No. 13/549,153, filed on Jul. 13, 2012, now Pat. No. 9,045,071.

(60) Provisional application No. 61/508,432, filed on Jul. 15, 2011.

(51) Int. Cl.
| | |
|---|---|
| *B07B 15/00* | (2006.01) |
| *B60P 3/14* | (2006.01) |
| *B29B 17/02* | (2006.01) |
| *B07B 11/08* | (2006.01) |
| *E01C 13/08* | (2006.01) |
| *B02C 21/02* | (2006.01) |
| *E01C 23/00* | (2006.01) |
| *B29L 31/00* | (2006.01) |
| *B29B 17/00* | (2006.01) |

(52) U.S. Cl.
CPC .............. *B07B 15/00* (2013.01); *B07B 11/08* (2013.01); *B29B 17/02* (2013.01); *B60P 3/14* (2013.01); *B02C 21/02* (2013.01); *B29B 2017/0094* (2013.01); *B29L 2031/732* (2013.01); *E01C 13/083* (2013.01); *E01C 23/00* (2013.01); *Y02W 30/622* (2015.05)

(58) Field of Classification Search
CPC ........ B07B 1/005; B07B 15/00; B29B 17/02; B29B 2017/0094; E01C 13/083; E01C 23/00; B02C 21/02; B02C 23/10
USPC .................................. 209/250, 412, 421, 930
See application file for complete search history.

(56) References Cited

U.S. PATENT DOCUMENTS

| | | |
|---|---|---|
| 4,179,770 A | 12/1979 | Nunes |
| 5,411,147 A | 5/1995 | Bond |

(Continued)

FOREIGN PATENT DOCUMENTS

| | | |
|---|---|---|
| EP | 2186942 | 5/2010 |
| KR | 10-0643810 | 11/2006 |

*Primary Examiner* — Joseph C Rodriguez
(74) *Attorney, Agent, or Firm* — Phillips Lytle LLP

(57) ABSTRACT

A mobile infill reclamation system comprising a mobile platform configured to be readily moved from a first location to a second location in relatively close proximity to an existing synthetic turf surface, a support structure mounted on the mobile platform, multiple processing components supported by the support structure and configured and arranged to process used infill material from the existing synthetic turf surface, an infill intake supported by the support structure and configured and arranged to receive the used infill material, and an infill output supported by the support structure and configured and arranged to discharge infill material processed by the processing components.

7 Claims, 15 Drawing Sheets

(56) References Cited

U.S. PATENT DOCUMENTS

| | | |
|---|---|---|
| 5,645,234 A | 7/1997 | Del Zotto |
| 5,902,414 A | 5/1999 | Keal et al. |
| 6,382,425 B1 | 5/2002 | Brickner et al. |
| 6,726,025 B1 | 4/2004 | Huskey |
| 6,935,587 B2 | 8/2005 | Brock et al. |
| 7,020,930 B2 | 4/2006 | Hile |
| 7,877,838 B2 | 2/2011 | Bos |
| 7,992,814 B2 | 8/2011 | Young et al. |
| 8,368,606 B1 | 2/2013 | Haugan |
| 8,464,801 B2 | 6/2013 | Bearden |
| 9,045,071 B2 * | 6/2015 | Nicholls et al. |
| 2003/0019150 A1 | 1/2003 | St. Onge et al. |
| 2003/0037388 A1 | 2/2003 | Feyma et al. |
| 2010/0319510 A1 | 12/2010 | Bearden |
| 2012/0263891 A1 * | 10/2012 | Rodgers ............... 428/17 |
| 2014/0265011 A1 | 9/2014 | Mashburn et al. |

* cited by examiner

TURF INFILL RECLAMATION METHOD

CROSS-REFERENCE TO RELATED APPLICATIONS

This application is a divisional of U.S. patent application Ser. No. 13/549,153, filed Jul. 13, 1012, which claims the benefit of U.S. Provisional Patent Application No. 61/508,432, filed Jul. 15, 2011. The entire contents of both of such applications are hereby incorporated by reference herein.

TECHNICAL FIELD

The present invention relates generally to the field of artificial turf, and more particularly to an improved mobile turf infill reclamation system.

BACKGROUND ART

Synthetic turf has been installed for decades as the playing surface for sports fields, including football, baseball and soccer fields. More recently, it has been used as an alternative to natural grass at playgrounds and residential homes and commercial buildings. Synthetic turf today generally comprises upstanding fibers or ribbons extending from a backing. The upstanding fibers resemble grass and the backing holds the fibers in place. In most modern synthetic turf systems, an infill is disposed between the upstanding fibers. The infill can include sand, rubber and/or other particles, depending on the performance characteristics desired.

In 1998 there were about 80 synthetic turf sports fields installed in the United States. By 2008, that number had risen to over 1,200. But synthetic turf has a limited useful life. For example, synthetic turf sports fields have a typical lifespan of from about 8 to about 12 years.

BRIEF SUMMARY OF THE INVENTION

With parenthetical reference to corresponding parts, portions or surfaces of the disclosed embodiment, merely for the purposes of illustration and not by way of limitation, the present invention provides a mobile infill reclamation system (15) comprising a mobile platform (16) configured to be readily moved from a first location to a second location in relatively close proximity to an existing synthetic turf surface, a support structure (18) mounted on the mobile platform, multiple processing components (23-26, 28-31) supported by the support structure and configured and arranged to process used infill material from the existing synthetic turf surface, an infill intake (22) supported by the support structure and configured and arranged to receive the used infill material, and an infill output (33) supported by the support structure and configured and arranged to discharge infill material processed by the processing components.

The mobile platform may be selected from a group consisting of a trailer, a truck chassis, a railway car and a detachable pod. The support structure may comprise a vibration dampening platform (30) and/or vibration dampening decking (40). The support structure may comprise vertically and horizontally extending framing (37, 38). The support structure may comprise fasteners having vibration dampening fittings. The support structure may comprise a processing chamber (58) defined by a front wall, side walls and a roof on the mobile platform and the processing components may be housed in the chamber. The support structure may comprise a power chamber (21) separated from the processing chamber by a fire wall (36).

At least one of the multiple processing components may be selected from a group consisting of a debris remover configured and arranged to separate foreign debris from the used infill material (33), a component separator configured and arranged to separate different components of the used infill material (23, 24), a screening device configured and arranged to separate a component of the used infill material by size (25), a component size screener configured and arranged to analyze size distribution of a component of the used infill (26), an augmentation device configured and arranged to add a desired infill component to the used infill material (28), a mixing device configured and arranged to providing a desired infill component mix (29), a rinsing device configured and arranged to treat the infill material (30), and a dryer configured and arranged to dry the infill material (31). The used infill material components may comprise rubber and sand. The component separator may be configured and arranged to separate the rubber and the sand based on size (23) and based on weight (24). The augmentation device may be configured and arranged to introduce new rubber to reach a desired rubber particle size distribution and to introduce new sand to reach a desired sand particle size distribution. The mixing device may be configured and arranged to mix sand and rubber components in amounts to reach a desired sand and rubber component ratio by weight.

The infill intake may comprise a pneumatic vacuum (41) and an intake receptacle (42). The infill output may comprise an automated bagging unit. The mobile infill reclamations system may further comprise a power source supported by the support structure on the mobile platform and connected to the processing components (21). The power source may be a diesel powered electric generator (48). The power source may comprise a battery and a solar panel (49). The mobile infill reclamations system may further comprise a ventilation system supported by the support structure (20). The ventilation system may comprise an air circulator (43) connected via a conduit (44) to at least one ventilation hood (45) proximate to at least one of the processing components. The mobile infill reclamation system may further comprise a conveyance system supported by the support structure and configured and arranged to convey the used infill material from the intake to the output via the processing components (19). The conveyance system may comprise a conveyor belt, a chute, a vacuum tube or an auger.

In another aspect, the invention provides a method of recycling infill comprising the steps of identifying an existing artificial turf surface having an infill, moving a mobile infill reclamation system to a position in relatively close proximity to the existing artificial turf surface (60), removing the infill from the artificial turf surface (61), conveying the removed infill to the mobile infill reclamation system (62), and processing the removed infill using the mobile infill reclamation system (63-70).

The step of processing the removed infill using the mobile infill reclamation system may comprise the steps of separating foreign debris from the removed infill (63), separating a component of the removed infill material by size (65), adding a desired infill component to the removed infill material (67), rinsing the removed infill material (69), and drying the removed infill material (70). The step of processing the removed infill using the mobile infill reclamation system may further comprise the steps of separating different components of the used infill material (63, 64), and mixing different components of the infill material to a desired infill component ratio (68). The method may further comprise the step of discharging the processed infill material from the mobile infill reclamation system (80). The processed infill material may be discharged into a super sack or wagon. The method may further comprise the step of applying the processed infill material to the artificial turf surface (81).

One object of the invention is to provide a mobile infill reclamation system that can be readily moved from location to location in order to process for reuse used infill in relatively close proximity to the location of the synthetic turf from which the infill was removed. Another object is to provide a method of processing infill from an existing artificial turf system for reuse. These and other objects and advantages will become apparent from the foregoing and ongoing written specification, the drawings, and the claims.

DETAILED DESCRIPTION OF THE PREFERRED EMBODIMENTS

Figure 1:
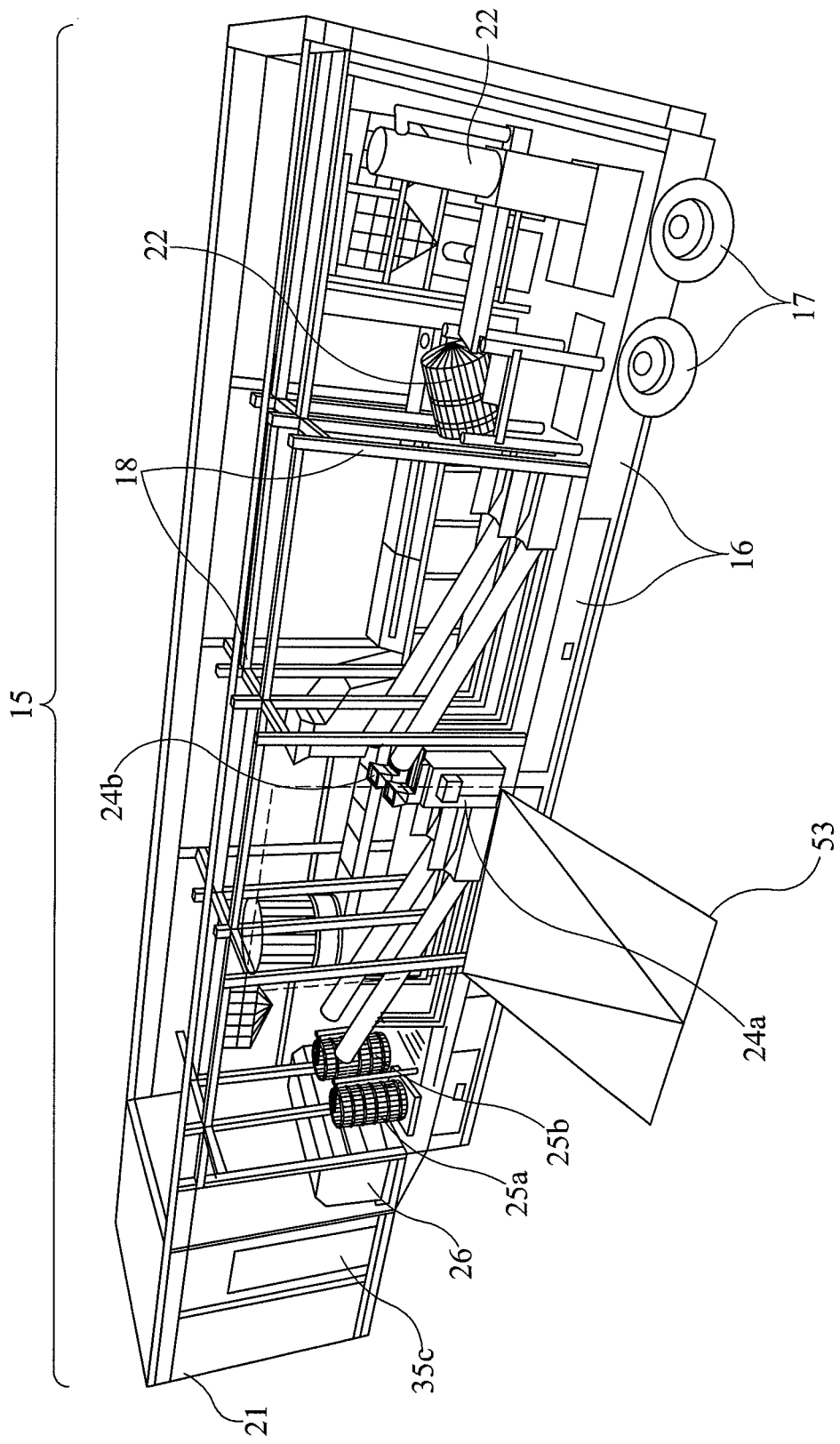
FIG. 1 is a partial right side cutaway perspective view of an embodiment of the mobile infill reclamation system.
Figure 2:
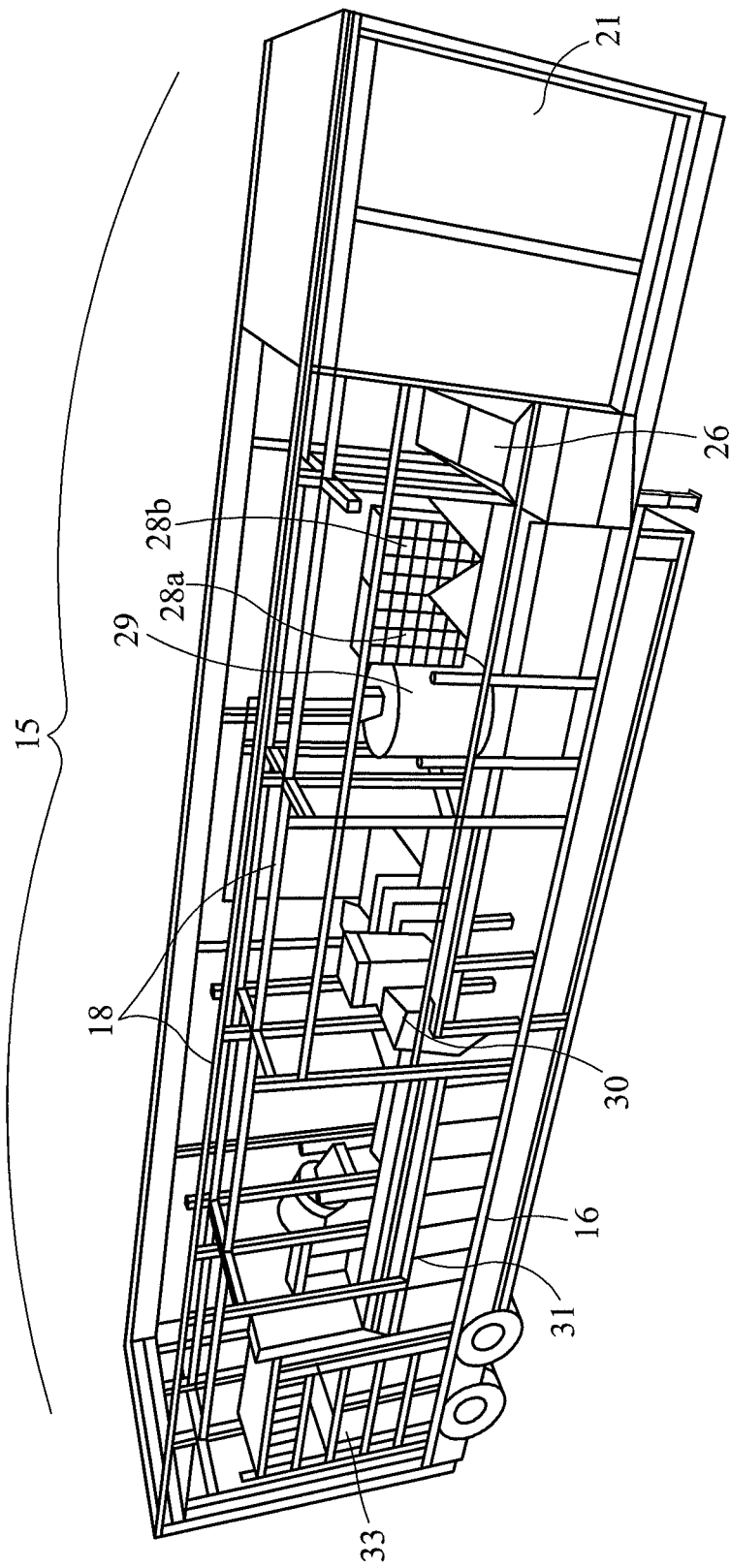
FIG. 2 is a partial left side perspective cutaway view of the system shown in FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, this invention provides a mobile infill reclamation system, of which the presently preferred embodiment is generally indicated at 15. As shown in FIGS. 1-10, system 15 generally includes mobile trailer 16, which is configured to be readily pulled from site to site by a truck or tractor, infill intake 22, multiple components 23-26 and 28-31 for processing infill from an existing synthetic surface for reuse, processed infill output 33, support structure 18 mounted on trailer 16, which is configured to at least in part support the infill processing components, conveyance systems 19 for conveying infill material from intake through the processing components to output, ventilation system 20 and power facility 21.

In this embodiment, trailer 16 is a conventional trailer about fifty-five feet long and about ten feet wide. Trailer 16 has multiple wheels 17 and connects to a conventional truck or tractor so it can be easily hauled from location to location on existing road systems. While trailer 16 is used in this embodiment, alternative mobile platforms may be employed, such as for example a rail car, a truck chassis, or a detachable container or pod. Trailer 16 may therefore be moved so that it is in close proximity to existing artificial turf surfaces, such as playing fields.

Trailer 16 includes a conventional outer shell (not shown) formed of a front wall, a left side wall having power chamber access door 35c and processing chamber swing doors 35a, a right side wall, and rear swinging doors 35b. A detachable ramp 53 may be used to access processing chamber 50 through doors 35a. As shown in FIGS. 1, 2 and 4-9, support structure 18 also includes a number of vertical struts 37 welded to the deck and ceiling as well as horizontally extending bracing 38 between the struts and the sides and ends of trailer 16. Support structure 18 includes high density vibration resistant decking 40, of variable thickness, that extends across the top of the floor of trailer 16. Also included are individualized dampening platforms 39 fastened to the deck and attached to the frame for each of the different processing components. Fasteners with vibration dampening fittings are employed in support structure 18. Thus, support structure 18 includes specially configured racks for holding processing components and shock absorbers for retaining the various processing components in proper position. Significant features are used to reduce vibration for both transport and operation of the processing equipment.

As shown in FIGS. 1-4, 6, 7, 9 and 10, power supply chamber 21 is provided at the front of trailer 16 and is separated from the processing equipment by firewall 36. Power supply chamber 21 houses electric generator 47, which is connected to and powers the processing equipment located in processing chamber 50 on the opposite side of fire wall 36. Diesel generator 47 is exhausted through the roof of trailer 16. As a supplemental power source, battery 54 in chamber 21 and connected solar panels 49 on the roof of trailer 16 may be provided to augment power supply for the processing components. Battery 54 may be charged from other sources such as a turbine or the power grid and used to power the processing equipment.

Figure 5:
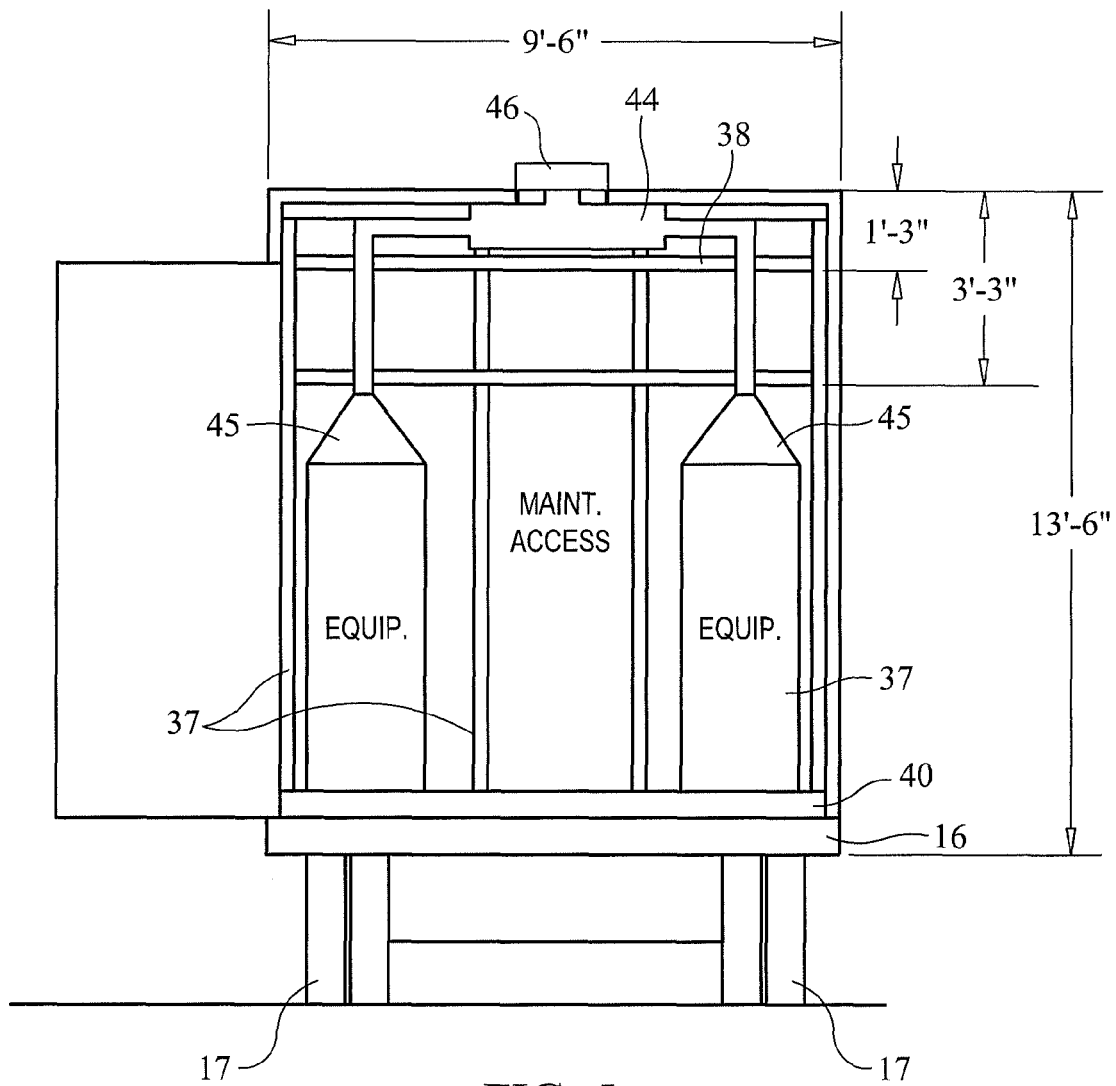
FIG. 5 is a transverse vertical cross-sectional view of the system shown in FIG. 1, taken generally at the longitudinal centerline of FIG. 1.
Figure 6:
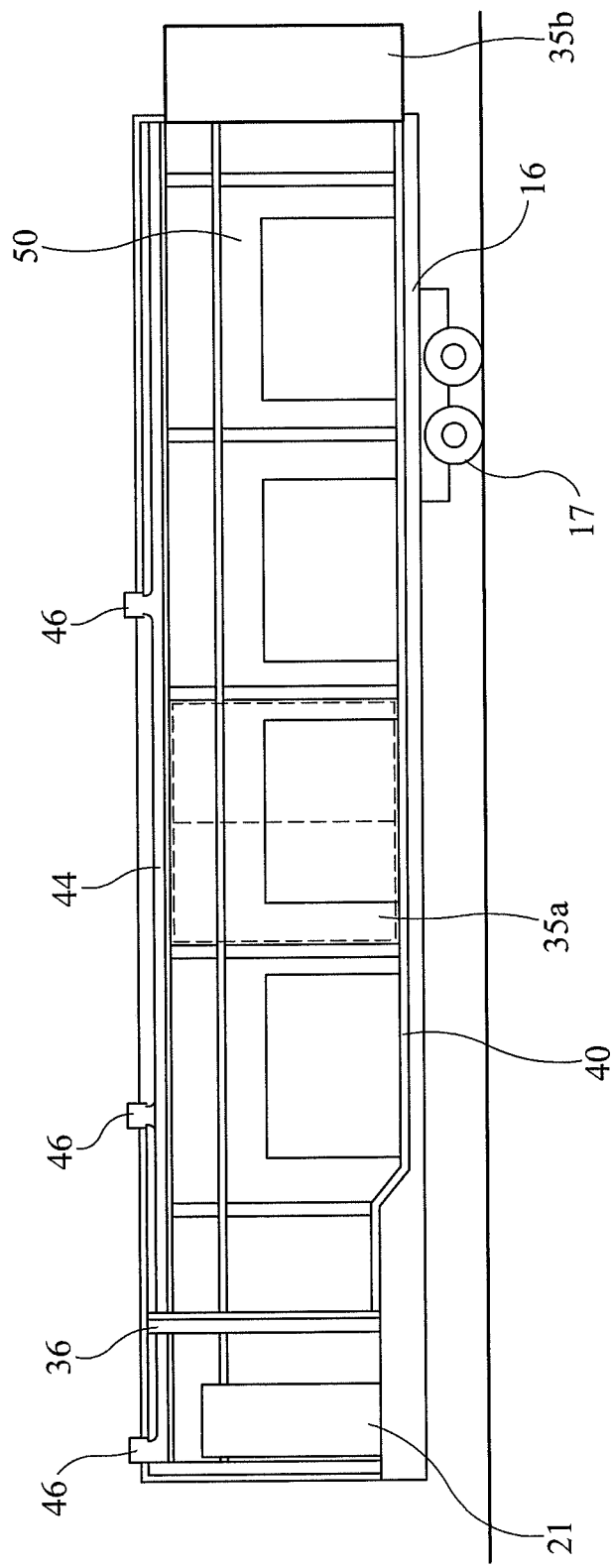
FIG. 6 is a longitudinal vertical cross-sectional view of the system shown in FIG. 1, taken generally at the transverse centerline of FIG. 1.
Figure 7:
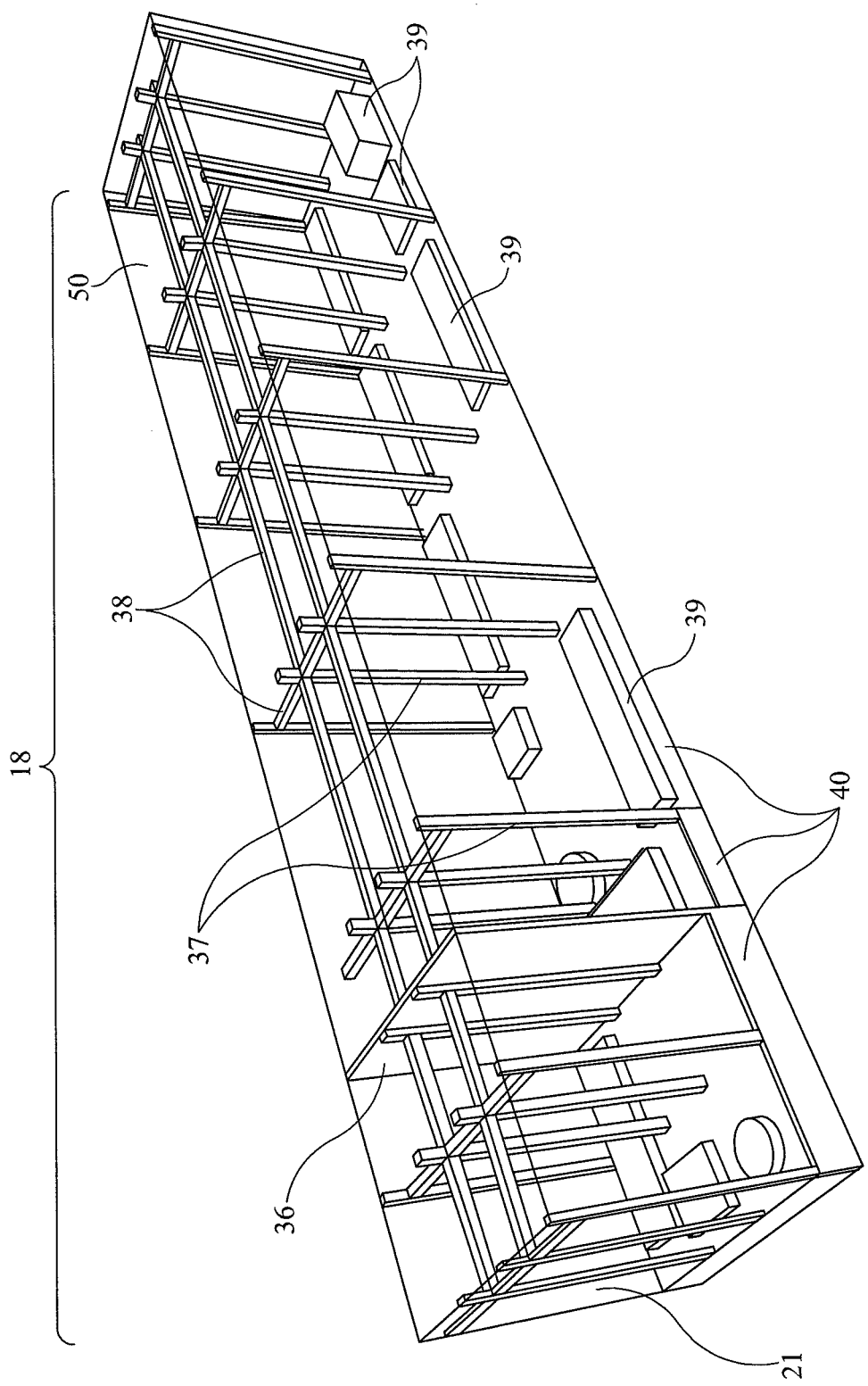
FIG. 7 is a perspective view of the support system shown in FIG. 1.
Figure 9:
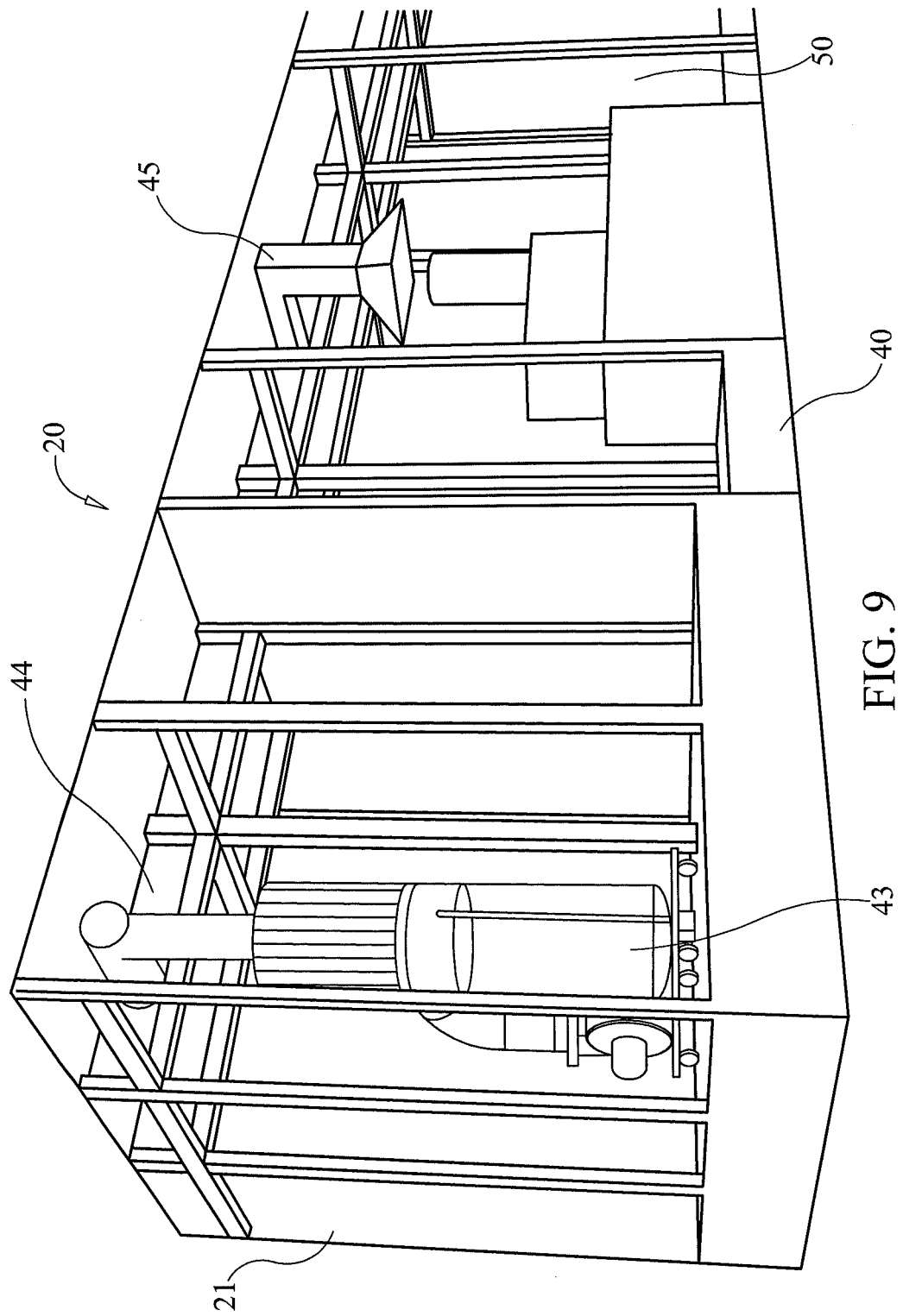
FIG. 9 is a partial perspective view of the ventilation system shown in FIG. 1.
Figure 10:
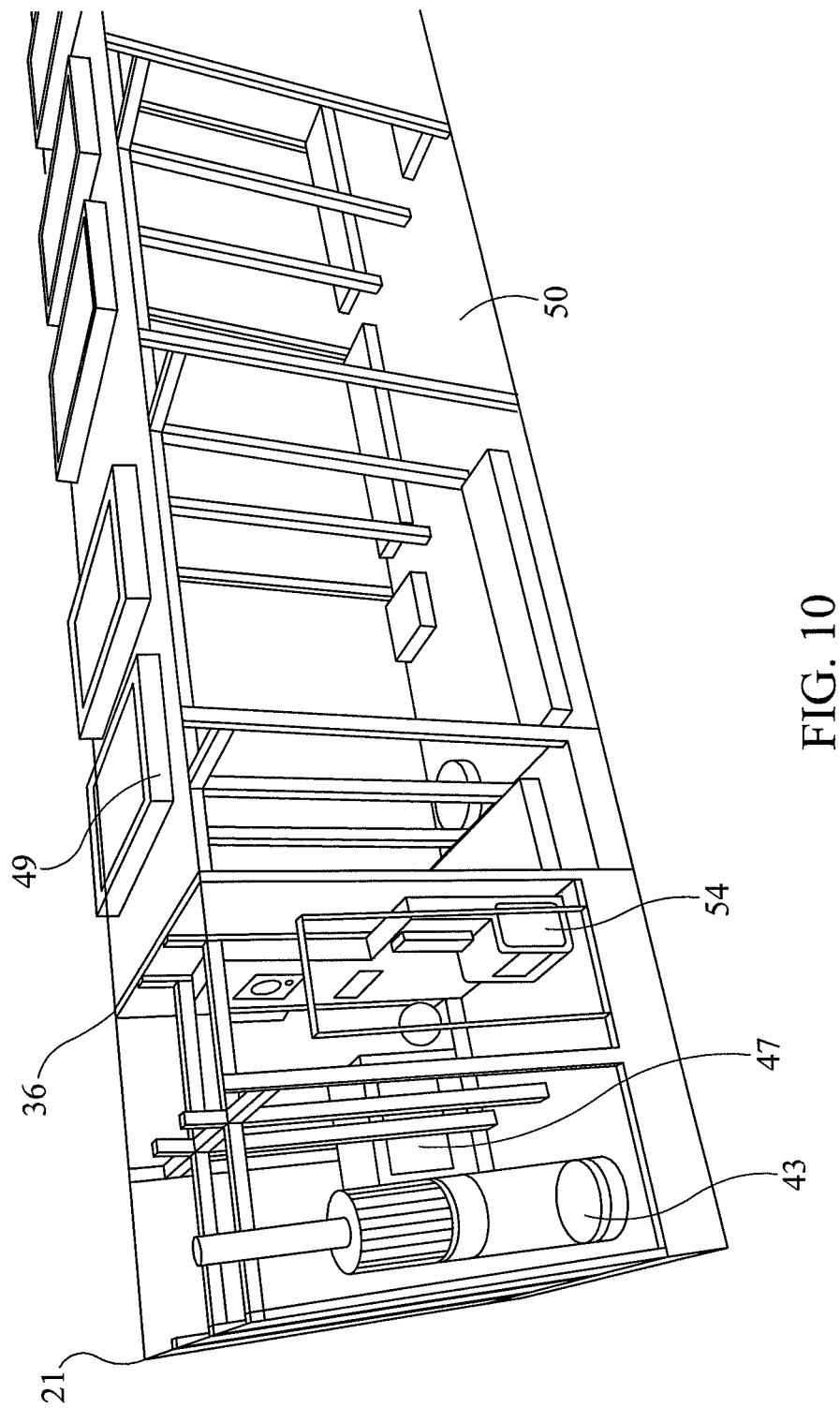
FIG. 10 is a perspective view of the power source shown in FIG. 1.

As shown in FIGS. 5, 6 and 9, ventilation system 20 is supported by support structure 18 to ventilate processing chamber 50. Dust and exhaust generated by the processing equipment is collected by ventilation hoods 45 positioned above the subject processing equipment and exhausted through ventilation chase 44 and exhaust ports 46 in the roof of trailer 16. Dust collection device 43, located in power chamber 21 and connected to chase 44, draws air from processing chamber 50 through hoods 45 and collects any remaining dust or particulates. Thus, dust collection device 43, via ventilation chase 44 and ventilation hoods 45 positioned above the subject processing equipment, collects, by vacuum, dust and other fine particles generated by the processing of the infill.

Mobile system 15 is first moved 60 on existing roadways to a location in relatively close proximity to the existing synthetic turf surface from which infill is to be removed and recycled, such as an existing synthetic turf playing field being replaced. Mobile system 15 is preferably positioned within five miles of the existing synthetic turf field being replaced, and more preferably is positioned adjacent or near enough to the existing synthetic turf field being replaced so that infill does not need to be trucked a significant distance on public roadways between the turf field and mobile system 15.

Infill from the existing synthetic turf field is removed 61 with conventional equipment that brushes, agitates and/or vacuums the infill up from between the synthetic fibers of the existing synthetic turf playing field. The infill is removed from the field and conveyed into a wagon, which is towed beside the removal equipment. This used infill is typically polluted with foreign debris, such as fibers, dirt, paint, pins, wrappers, band-aids, glass and other items. Once placed in the removal trailer, the infill is transported a relatively short distance to mobile system 15. The "Eliminator" infill removal machine manufactured by Redexim Charterhouse may be used in this process. Such equipment removes the infill from the synthetic turf with a soft rotating brush that lifts the material to a conveyer belt system and wagon driven alongside the machine.

Figure 3:
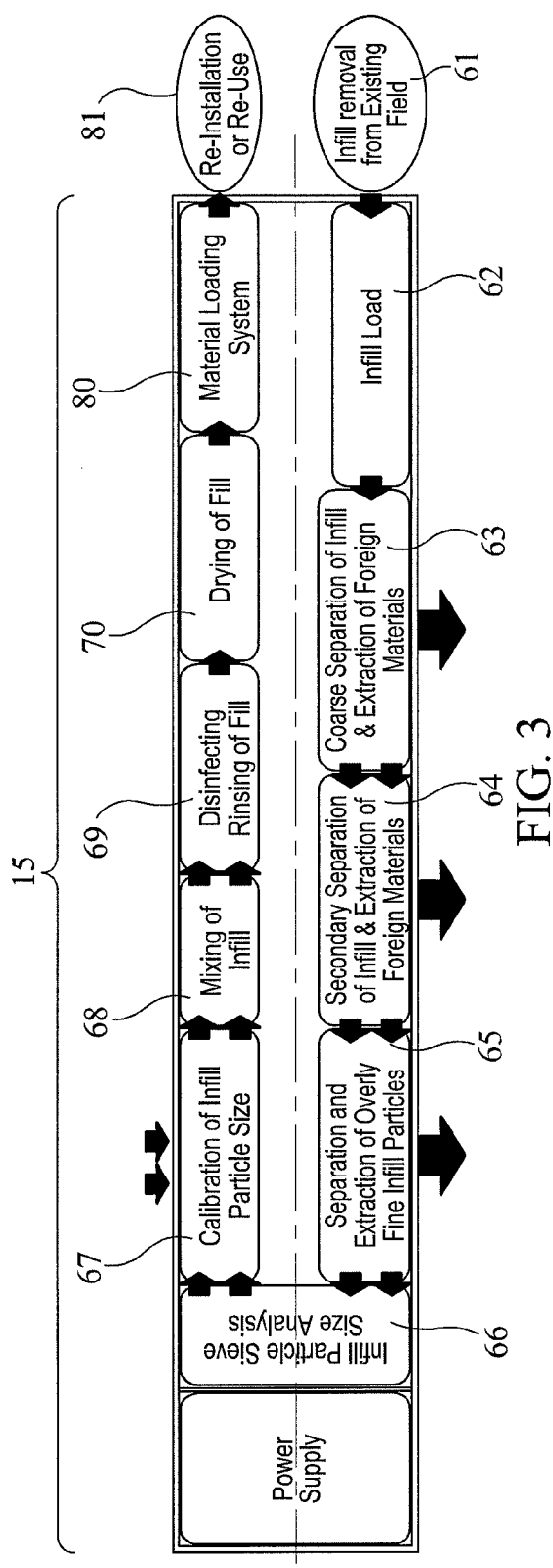
FIG. 3 is a processing schematic plan view of the system shown in FIG. 1.
Figure 4:
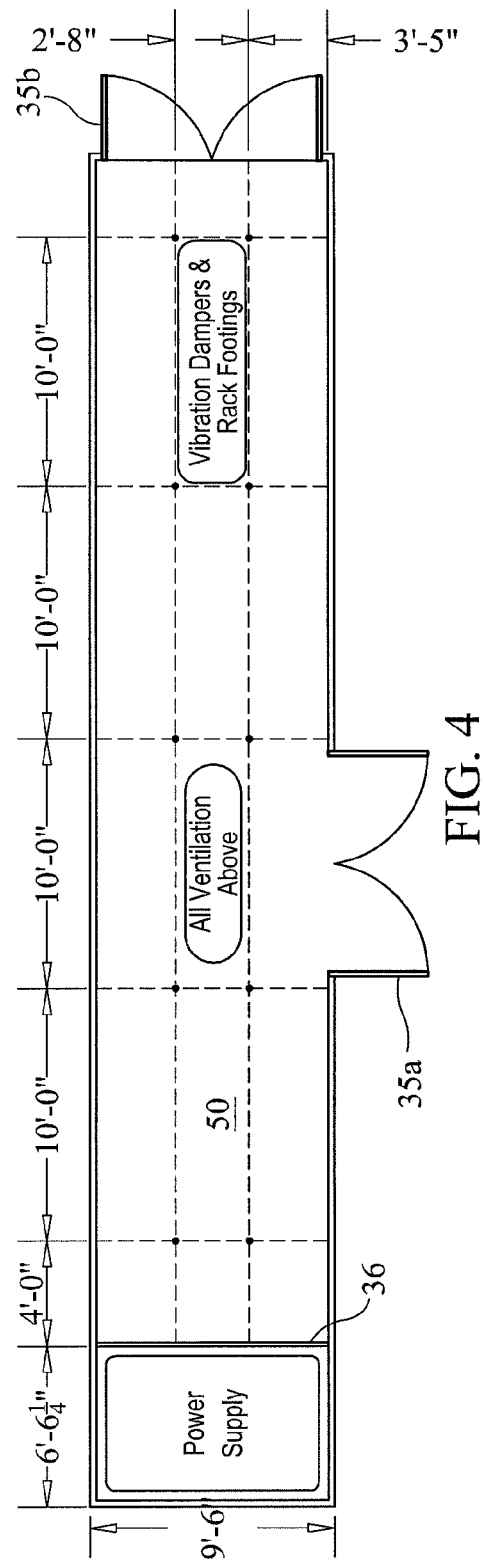
FIG. 4 is a floor plan of the system shown in FIG. 1.
Figure 11:
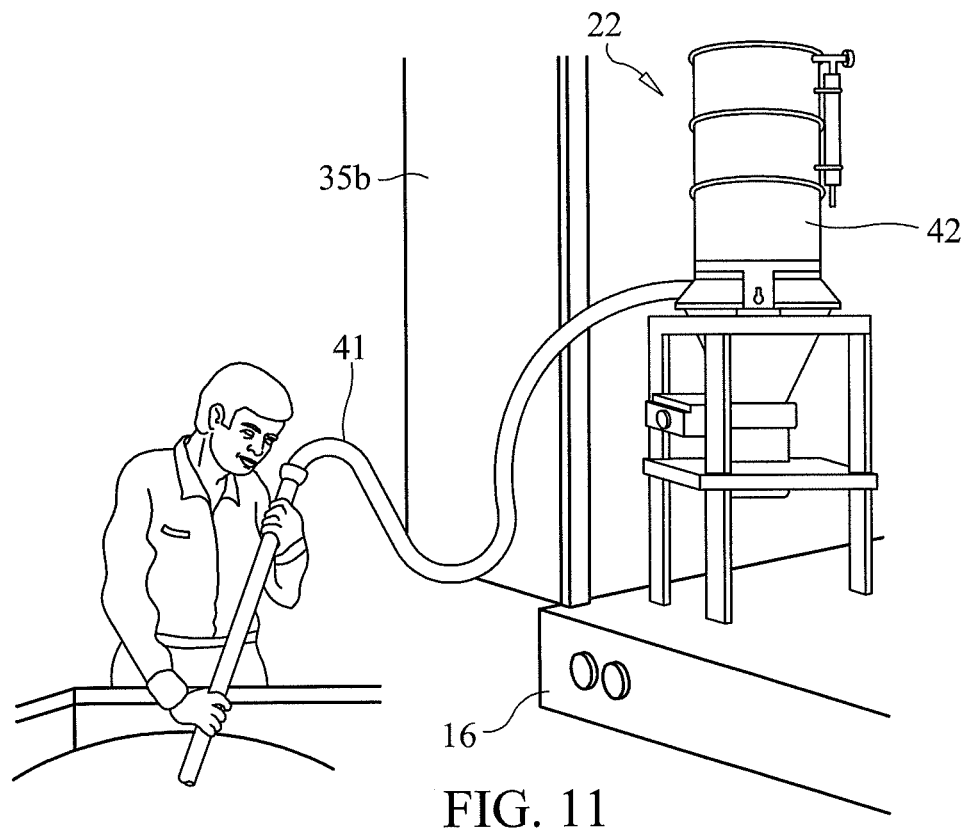
FIG. 11 is a perspective view of the intake device shown in FIG. 1.
Figure 21:
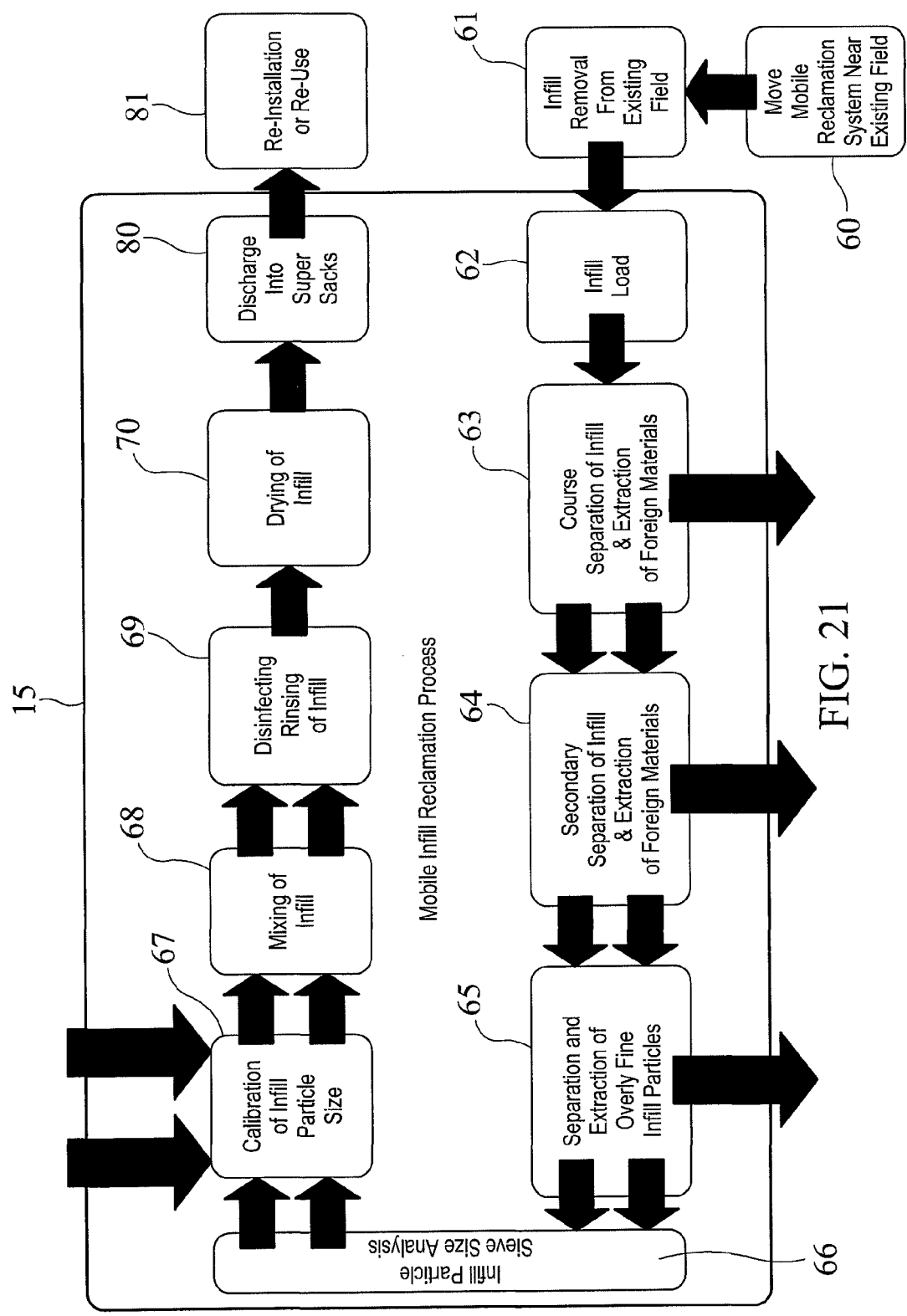
FIG. 21 is a flow chart showing the method of processing used infill using the system shown in FIG. 1.

FIG. 3 is a schematic plan view of the infill processing equipment showing the placement of such equipment in trailer 16. As shown in FIGS. 3 and 21, the first step in the processing system is infill loading 62. Once the infill is reclaimed from the field, it is transported to the rear of mobile system 15. Rear doors 35b are opened and the used infill is vacuumed up pneumatically with intake 22. As shown in FIG. 11, intake 22 includes hose 41, which is extendable to the wagon filled with used infill. The used infill is pneumatically conveyed up through hose 41 into storage silo 42. Storage silo 42 in turn feeds course particulate separator 23 at a desired delivery rate. While a pneumatic intake is shown and described, other options, such as an external intake container and a bottom-fed mechanical screw driven conveyor or auger to the storage silo, may be employed.

Figure 12:
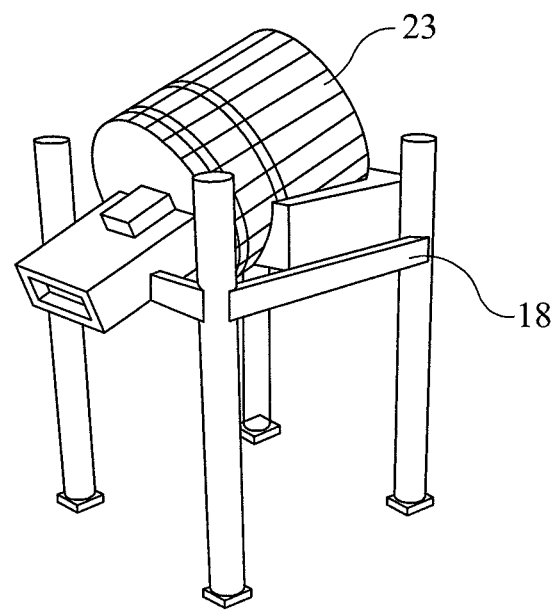
FIG. 12 is a perspective view of the course infill separation and debris removal mechanism shown in FIG. 1.

As shown in FIGS. 3 and 21, the second step in the process is to begin to separate the used infill into its component parts and to extract foreign material from the used infill 63. If the used infill was a two component infill, such as a mix of sand and rubber, this second step begins the process of separating the infill into those two component parts. In this regard, the rubber particles are typically larger and lighter than the sand particles. The used infill is run through screen separator 23, shown in FIG. 12. Screen separator 23 has a single stream input from intake 22 and has generally three outputs based on screen size, namely a primarily rubber output, a primarily sand output and a foreign debris output. The primary function of screen separator 23 is to separate the infill into its component parts, typically sand and rubber. As a secondary function, separator 23 removes a limited amount of foreign material. Screen separator 23 has multiple levels of increasingly finer inclined screens and shakes the used infill through the screens. Typically the foreign material is larger than sand and rubber and is caught in the larger sized top screen, where it is output down a chute to containment structure or receptacle 51. The rubber is typically caught at the next level and the sand will typically fall through to the bottom. The middle level is directed to a rubber output and the bottom fines are directed to a sand output. A modified Model 8400-60 Forsberg screen separator may be employed in this embodiment.

Figure 13:
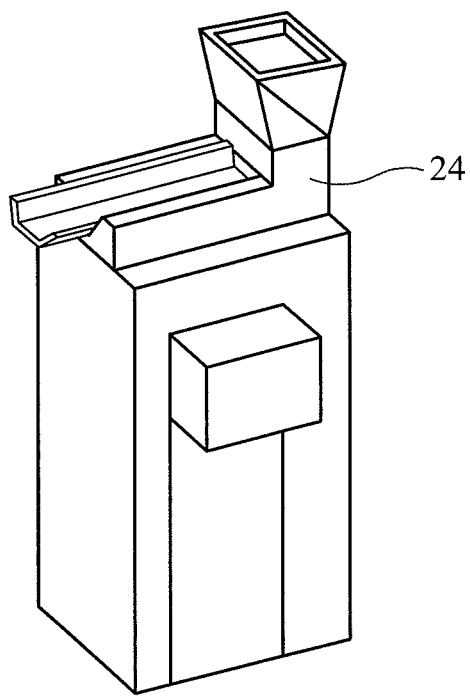
FIG. 13 is a perspective view of the secondary infill separation and debris removal mechanism shown in FIG. 1.

As shown in FIGS. 3 and 21, the third step in the process is to complete the separation of the infill into its component parts and removal of foreign material or debris 64. The rubber output from coarse separator 23 is run through pressure type destoner 24a, shown in FIG. 13, to complete separation of the infill into its component parts and to remove and recover all foreign material or debris. In a parallel stream, the sand output from coarse separator 23 is run through parallel pressure type destoner 24b. With this equipment, the respective streams of used infill are conveyed over an inclined, vibrating, screen-covered deck with a steady airflow to hold the infill material in stratified flotation. The lighter rubber stays in the upper strata as it flows down the inclined deck and the heavier sand travels up the inclined deck. At the top of the deck of destoner 24a, the heavier foreign material and debris is caught in a screen and removed pneumatically to containment 51. The remaining sand is directed to a sand output. The rubber at the bottom of destoner 24a is directed to a rubber output. At the top of the deck of destoner 24b, the heavier foreign material and debris is caught in a screen and removed pneumatically to containment 51. The remaining sands is directed to the sand output, where is mixes with the sand from the top of destoner 24a. The rubber at the bottom of destoner 24b is directed to the rubber output, where it mixes with the rubber from the bottom of destoner 24a. Thus, the initially separated sand infill enters a process to remove any remaining rubber and the initially separated rubber infill enters a process to remove any remaining sand, and any additional foreign debris is removed by vacuum. The foreign material is collected in containment 51 and removed through doors 35b. A modified Model 7-G Forsberg pressure destoner may be used in this embodiment.

Figure 14:
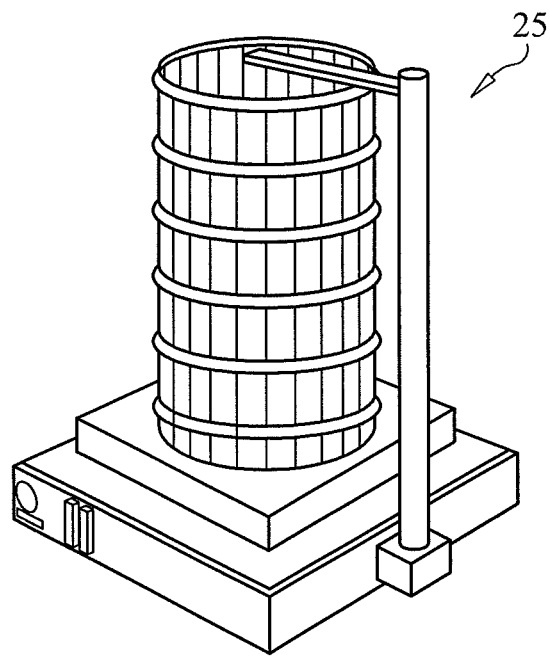
FIG. 14 is a perspective view of the refined sand and rubber separator shown in FIG. 1.
Figure 15:
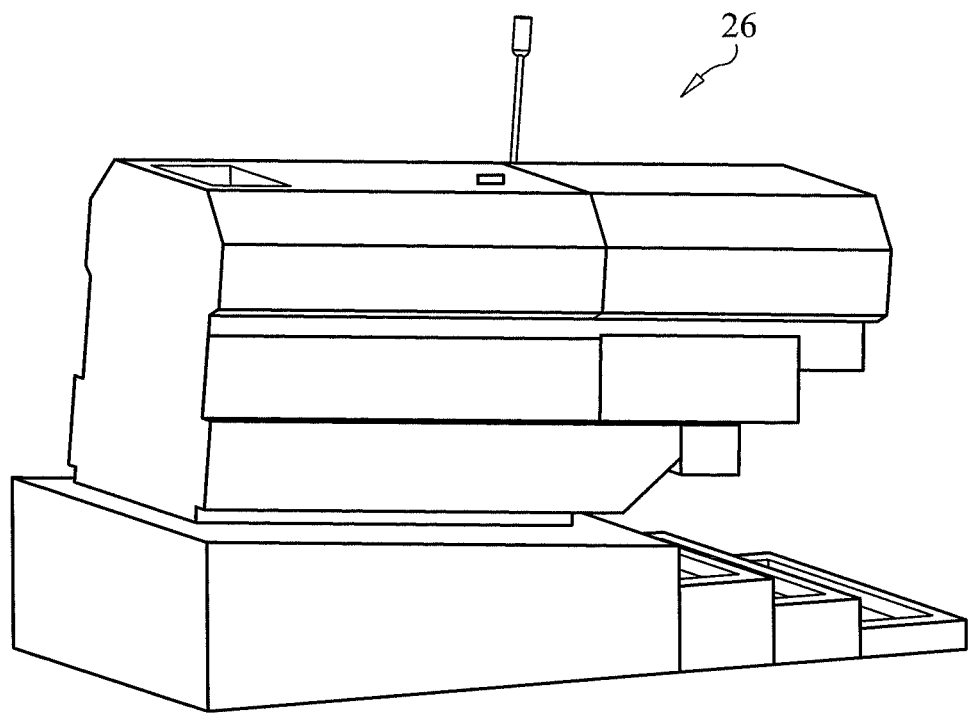
FIG. 15 is a perspective view of the dual sand and rubber sieve size screener shown in FIG. 1.
Figure 16:
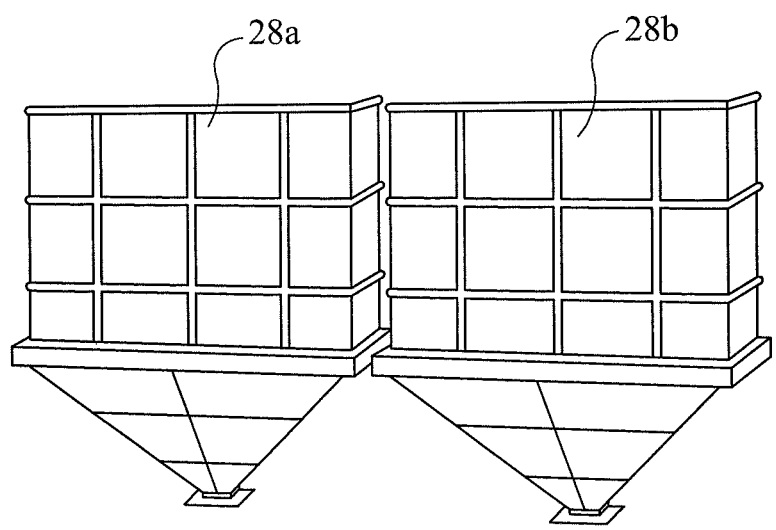
FIG. 16 is a perspective view of the sand and rubber augmentation hoppers shown in FIG. 1.

As shown in FIGS. 3 and 21, the fourth step is to separate out any infill components that are too small for the desired infill particle distribution 65. Sand and rubber can degrade or break down in size over time. Thus, the used infill may have sand and rubber particles of an undesirable small size that need to be separated and removed. Using silo screen 25a, shown in FIG. 14, the sand output from destoners 24a and 24b is run through silo screen 25a and is separated in size to a desired minimum size. The sand falling though and not meeting the minimum size is removed. The remaining sand is directed to a sand output. Similarly, using silo screen 25b, the rubber output from destoners 24a and 24b is run through silo screen 25b and is separated in size to a desired minimum size. The rubber falling though and not meeting the minimum size is removed. The remaining rubber is directed to a rubber output. For example, if an infill having a 20-40 sand mesh size distribution is desired, a 40 mesh sieve is provided at the bottom of silo 24a and any sand particles falling through it are removed. Similarly, if an infill having a 10-20 rubber mesh size distribution is desired, a 20 mesh sieve is provided at the bottom of silo 24*b* and any rubber particles falling through it are removed. The removed materials may be conveyed to containment 51.

As shown in FIGS. 3 and 21, the fifth step is to analyze the particle size distribution of the used infill 66. Using inertia screening separator 26, shown in FIG. 26, the components of the used infill are separated by sieve size to analyze their distribution. Thus, sand from the sand output of silo 25*a* and rubber from the rubber output of silo 25*b* are separated by size to determine their respective size distributions. Separator 26 is a dual track analyzer, so sand from silo 25*a* is run through the first track and rubber from silo 25*b* is run through the second track. A screening motion helps to provide a constant product contact with the screening surface to thereby maximize exposure to the screen aperture. The separator may have a cushion mount suspension system, a straight-line reciprocating motion, a self-cleaning screen, quick-change screens and may be formed from stainless steel. A modified Forsberg Inertia Screen Separator may be used in this embodiment.

As shown in FIGS. 3 and 21, the sixth step is to recalibrate the infill to the desired sieve size distribution 67. Once the existing rubber and sand of the used infill has been analyzed and its sieve size distribution determined, new sand and/or rubber may be introduced from wall mounted material hoppers 28*a* and 28*b*, respectively, to insure the final sieve size of the processed infill meets the performance criteria and characteristics of the desired new or refurbished field. In this regard, many artificial turf systems attempt to achieve a 20-40 mesh size distribution of sand and a 10-20 mesh size distribution of rubber. To recalibrate to this distribution typically requires adding new rubber and sand particles on the larger side of the range. Sand and rubber hoppers 28*a* and 28*b*, respectively, are typically filled with particle sizes on the higher end of the desired range and are used to augment the infill to the desired distribution. Hoppers 28*a* and 28*b* are adapted to be mounted with automatic feeders to the sand and rubber processing streams, respectively. Also, the right side wall of trailer 16 may be provided with specially configured input ports or an access panel through which new infill components may be easily fed to hoppers 28*a* and 28*b*.

Figure 17:
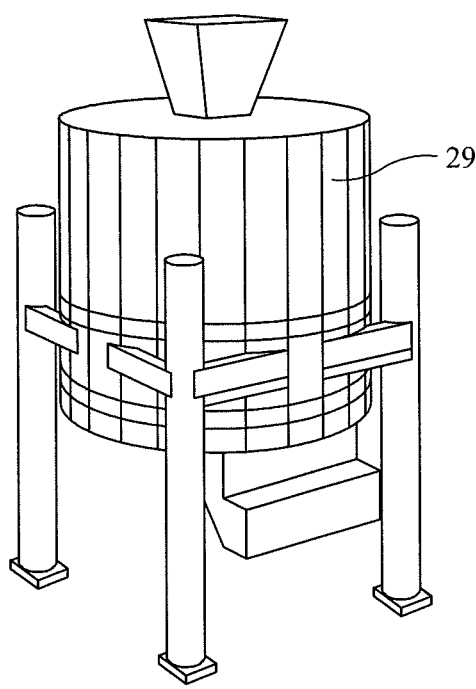
FIG. 17 is a perspective view of the sand and rubber mixer shown in FIG. 1.

As shown in FIGS. 3 and 21, the seventh step is to mix the infill to the desired component ratio 68. In addition to meeting the desired particle range and distribution of sand and rubber, the desired sand and rubber percentage mix by weight is provided with mixer 29, shown in FIG. 17. For example, in the case of a sand and rubber mixed infill, it may be desirable to have the sand and rubber components mixed together in a 70% rubber and 30% sand ratio by weight, with a sand particle size distribution of between 20 and 40 mesh and a rubber particle size distribution between 10 and 20 mesh. The outputs of rubber and sand, respectively, from the recalibration process at the desired size ranges are therefore measured and mixed with mixer 29 to the desired 70% to 30% ratio. At this point, the processing moves from two streams back to a single stream. Alternatively, calibration and mixing may occur at the same time, with hoppers 28*a* and 28*b* feeding into mixer 29. As explained below, in yet another alternative this step may not be necessary if the infill removed and the infill desired has a single component, such as an all rubber infill.

Figure 18:
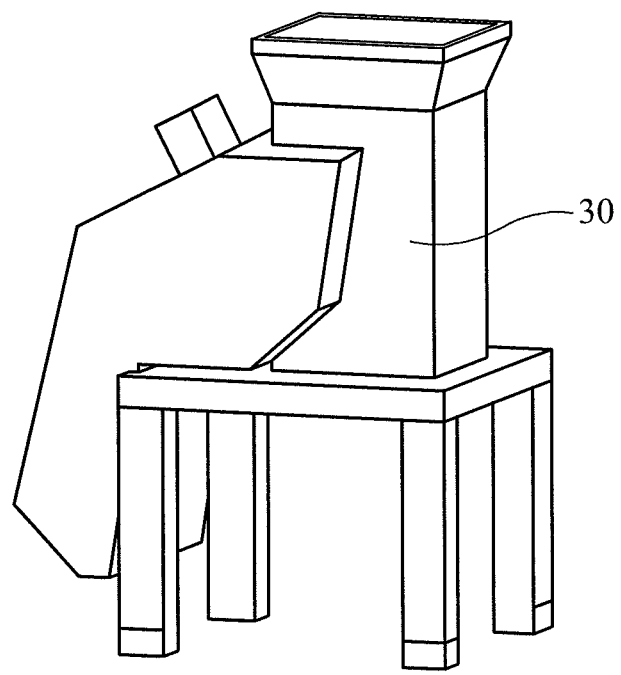
FIG. 18 is a perspective view of the rinse mechanism shown in FIG. 1.

As shown in FIGS. 3 and 21, the eighth step is to clean and disinfect the infill 69. The combined infill output from mixer 29 is cleaned and disinfected in a rinse application with rinsing unit 30, shown in FIG. 18. In this embodiment, the infill is first washed and then a disinfecting rinse is applied to provide a desired final product. For example, a conventional solution may be applied to protect from microbial contamination and odors or to provide long term control against a broad spectrum of known bacteria, mold, fungi and algae. Preferably the antimicrobial solution provides continued, long-lasting protection without leaching harsh chemicals or heavy metals into the environment and will not rub off or seep into the skin. A Turfaide disinfectant rinsing solution by Coating Specialist Group may be used in this embodiment.

Figure 19:
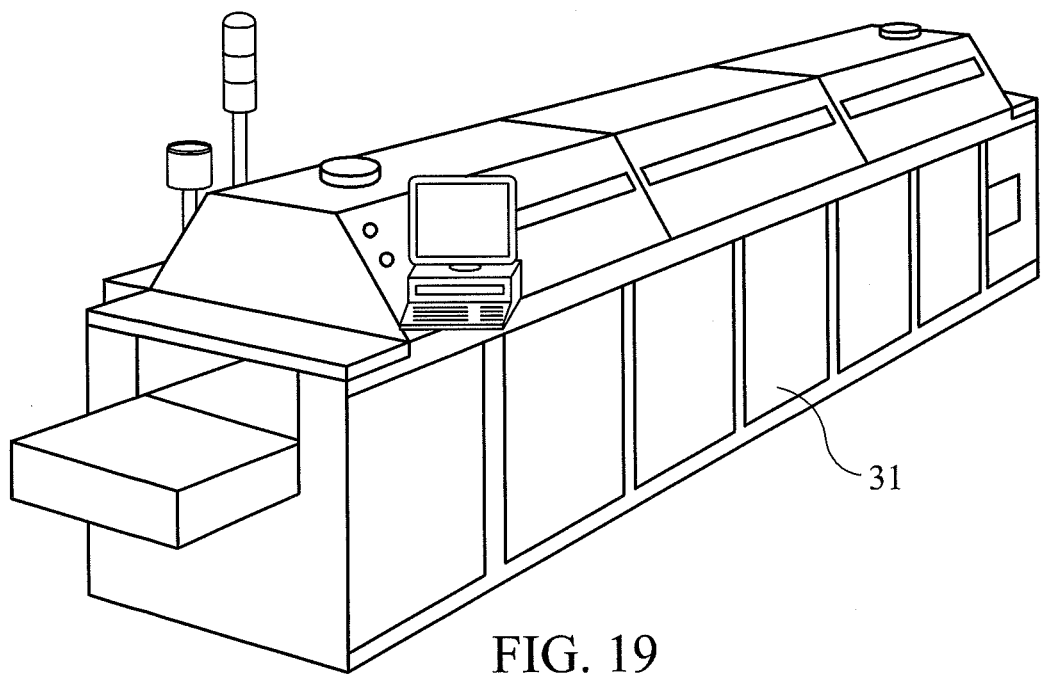
FIG. 19 is a perspective view of the dryer shown in FIG. 1.

As shown in FIGS. 3 and 21, the ninth step is to dry the infill 70. The output from rinser 30 is dried using belt air dryer 31, shown in FIG. 19. Heated air is circulated over the infill as it passes through dryer 31 to evaporate moisture and dry the infill before it is discharged. A BDS belt drying system from Andritz may be used in this embodiment.

Figure 20:
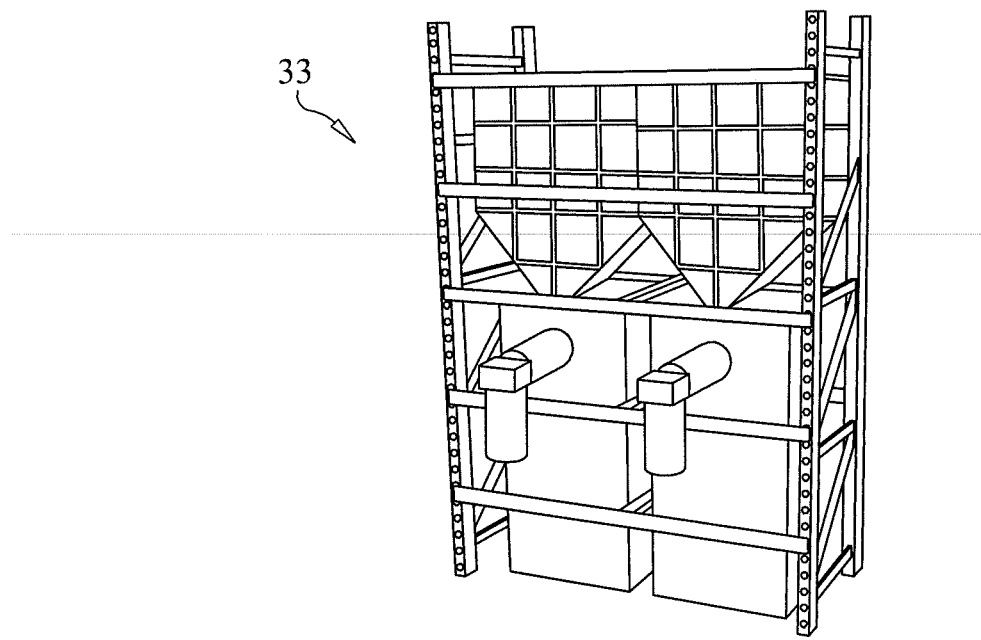
FIG. 20 is a perspective view of the discharge mechanism shown in FIG. 1.

As shown in FIGS. 3 and 21, the processed infill is then bagged 80 for reuse using discharger 33, shown in FIG. 20. Discharger 33 is configured to direct the processed infill either into super sacks that can be unloaded from trailer 16 through rear doors 35*b* or directly into the back of a wagon for reuse 81 in an existing field in close proximity to mobile system 15. Discharger 33 is provided with multiple output streams. Accordingly, a single outlet or multiple outlets may be used for increased efficiency in the super sack loading process 80. Typically, the processed infill is placed in super sacks at a rate of not more than about 3,000 pounds per sack. The infill material may either be reapplied to the same field or it can be transported to another location for incorporation into a different field. The Bellojet ZC automated bag loader by WamGroup may be used in this embodiment.

It should be noted that mobile system 15 may be used to process a used infill having a single component, such as an all rubber infill. In this scenario, only the rubber processing stream is used and mixer 29 may be bypassed if not needed. In yet another alternative, a dual component used infill may be processed to provide a single component infill. For example, if the used infill is a combination of rubber and sand and an all rubber infill is desired, after step three or step four the sand may be removed from further processing and transported from trailer 16 through door 35*a*. Also, mixer 29 may be bypassed if not needed. In yet another alternative, a single component used infill may be processed into a dual component infill. For example, an all rubber used infill may be processed through step 6 using the rubber processing stream and then mixed in mixer 29 with a desired size and amount of new sand from an alternative source. This new sand may be provided through door 35*a* or alternative input ports in trailer 16.

As shown in FIG. 5, access space 52 is provided between the processing components so that they can be maintained and repaired without having to disassemble the system. Ramp 53 to door 35*a* may be used to convey material or equipment into or out of trailer 16.

Figure 8:
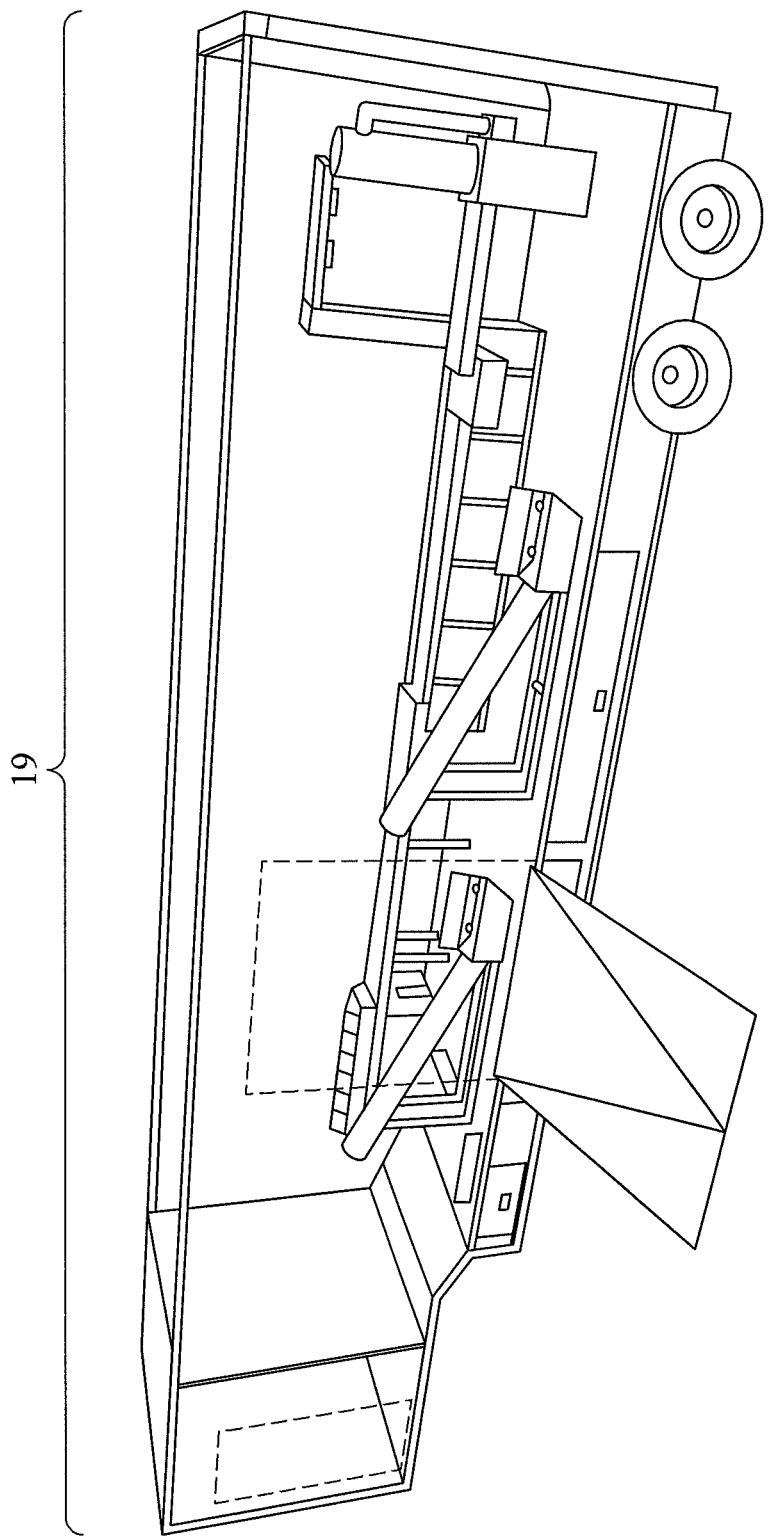
FIG. 8 is a perspective view of conveyance equipment for the system shown in FIG. 1.

Depending on the desired level of automation, infill conveyance system 19 is provided to move the infill from one processing component to the next. Conveyance system 19 may include belts, rollers, skids, slides, chutes, augers, air moving systems and hoses. As shown in FIG. 8, in this embodiment conveyance equipment 19 extends from used infill intake 22, where the used infill is introduced into the mobile system, to infill discharge 33, where the processed and recycled infill, typically rubber and sand, is output from the mobile system into super sacks or the like. The conveyance equipment is configured to move the infill material at the required speed for the processing components. In this embodiment, conveyance between storage silo 42 and screen separator 23 is provided with a pneumatic hose, conveyance between the outputs of screen separator 23 and destoners 24*a* and 24*b* is provided with augers, conveyance between destoners 24*a* and 24*b* and silo screens 25*a* and 25*b*, respectively, is provided by augers, conveyance between silo screens 25a and 25b and the inputs of screen separator 26 is provided by augers, conveyance between the outputs of screen separator 26 and mixer 29 is by conveyor belts, conveyance between mixer 29 and rinsing unit 30 is by conveyor belt, conveyance between rinsing unit 30 and dryer 31 is by conveyor belt, and conveyance between dryer 31 and discharger 33 is by conveyor belt. The discharge is pneumatic and gravity fed into super sacks. Other means of conveyance may be used alternatively as desired.

Thus, infill may be extracted from a field and processed, in a 55 foot transport trailer hauled to a location adjacent or near to the site by a truck or tractor, to remove foreign debris, separate the various components of the infill, typically sand and rubber, recalibrate the components to a desired size distribution, remix the components to a desired ratio, clean, sanitize and dry the processed infill, and discharge the processed infill into waiting containers or wagons. The recycled infill may then be redistributed to the existing field, in the case of cleaning and maintenance of a field, or utilized in the installation of a new synthetic field, perhaps even at the same facility.

The present invention contemplates that many changes and modifications may be made. Therefore, while the presently-preferred form of the mobile infill reclamation system has been shown and described, and a number of alternatives discussed, persons skilled in this art will readily appreciate that various additional changes and modifications may be made without departing from the spirit of the invention, as defined and differentiated by the following claims.

The invention claimed is:

1. A method of recycling infill comprising the steps of:
identifying an existing artificial turf surface having synthetic fibers and an infill between said synthetic fibers;
moving a mobile infill reclamation system to a position in relatively close proximity to said existing artificial turf surface;
removing said infill from between said synthetic fibers of said artificial turf surface;
conveying said removed infill to said mobile infill reclamation system after said step of removing said infill from between said synthetic fibers of said artificial turf surface; and
processing said removed infill using said mobile infill reclamation system.

2. The method set forth in claim 1, wherein said step of processing said removed infill using said mobile infill reclamation system comprises the steps of:
separating foreign debris from said removed infill;
separating a component of said removed infill material by size;
adding a desired infill component to said removed infill material;
rinsing said removed infill material; and
drying said removed infill material.

3. The method set forth in claim 2, wherein said step of processing said removed infill using said mobile infill reclamation system further comprises the steps of:
separating different components of said removed infill material; and
mixing different components of said infill material to a desired infill component ratio.

4. The method set forth in claim 2, and further comprising the step of discharging said processed infill material from said mobile infill reclamation system.

5. The method set forth in claim 4, wherein said processed infill material is discharged into a super sack or wagon.

6. The method set forth in claim 2, and further comprising the step of applying said processed infill material to said artificial turf surface.

7. The method set forth in claim 1, wherein said step of processing said removed infill using said mobile infill reclamation system comprises the steps of separating a component of said removed infill by size and determining a size distribution of at least a component of said removed infill.

* * * * *